(12) United States Patent
Fullmer et al.

(10) Patent No.: US 9,398,143 B1
(45) Date of Patent: Jul. 19, 2016

(54) AUTOMATIC DETERMINATION OF DEVICE MODE BASED ON USE CHARACTERISTICS

(71) Applicant: Amazon Technologies, Inc., Reno, NV (US)

(72) Inventors: Gy Stuart Fullmer, Santa Cruz, CA (US); Sean Thomas Congden, Mountain View, CA (US); Levon Dolbakian, Los Gatos, CA (US); Arnaud Marie Froment, San Jose, CA (US); Brett Nathan Lynnes, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 10 days.

(21) Appl. No.: 14/456,579

(22) Filed: Aug. 11, 2014

(51) Int. Cl.
*H04W 88/02* (2009.01)
*H04M 1/725* (2006.01)
(52) U.S. Cl.
CPC ................................. *H04M 1/72577* (2013.01)
(58) Field of Classification Search
CPC .................................................... H04W 88/02
USPC .............. 455/90.1, 550.1; 340/576; 180/272; 345/173
See application file for complete search history.

(56) References Cited

U.S. PATENT DOCUMENTS

| | | | | |
|---|---|---|---|---|
| 2008/0320588 | A1* | 12/2008 | Lipetz | G06F 21/6218 726/19 |
| 2013/0305351 | A1* | 11/2013 | Narendra | H04M 1/673 726/19 |
| 2014/0223550 | A1* | 8/2014 | Nagar | G06F 21/31 726/19 |

OTHER PUBLICATIONS

Ridden, Paul; Gizmag.com; "BreathalEyes app tells you if you're too drunk to drive." Jan. 5, 2012. (6 pgs.) (accessed Sep. 4, 2014 at http://www.gizmag.com/breathaleyes-iphone-app-alcohol-detector/20991/).
Walton, Zach; Webpronews.com; "New App Can Tell If You're Drunk." Jan. 30, 2012. (5 pgs.) (accessed Sep. 4, 2014 at http://www.webpronews.com/app-drunk-2012-01).
iTunes Preview: "Drunk Text Savior" by Rocket Tier LLC (2 pgs.) (accessed Sep. 4, 2014 at https://itunes.apple.com/us/app/drunk-text-savior/id472615268?mt=8).
"The app from 'The Internship'" by Faceless, &faceless; Nov. 9, 2013. (4 pgs.) (accessed Sep. 4, 2014 at http://www.bubblews.com/news/1535626-the-app-from-the-internship).
GooglePlay: Drunk Test by 8D8 Apps; Oct. 6, 2012. (2 pgs.) (accessed Sep. 4, 2014 at https://play.google.com/store/apps/details?id=com.adamcox.drunktest).
GooglePlay: Drunk Guard by robin dev; Nov. 14, 2012 (2 pgs.) (accessed Sep. 4, 2014 at https://play.google.com/store/apps/details?id=drunk.guard).

* cited by examiner

*Primary Examiner* — Kevin Kim
(74) *Attorney, Agent, or Firm* — Sutherland Asbill & Brennan LLP

(57) ABSTRACT

Systems, methods, and computer-readable media are disclosed for generating a baseline use profile that indicates typical patterns of use of a device over time, transitioning the device to a challenge mode when sensor data indicates a deviation from the baseline use profile by more than a permissible tolerance, presenting challenges to the user while in the challenge mode, and determining whether to restrict or allow access to device functionality based on user responses to the challenges.

17 Claims, 8 Drawing Sheets

AUTOMATIC DETERMINATION OF DEVICE MODE BASED ON USE CHARACTERISTICS

BACKGROUND

Mobile devices and mobile device connectivity have become virtually ubiquitous over the last decade or so. As a result, mobile device users are generally able to stay connected regardless of where they may be located or the circumstances in which they may use their devices. However, despite this ability to communicate at will, there are a number of situations in which it may not be advisable for a mobile device user to use his/her device to communicate with others.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily, the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1:
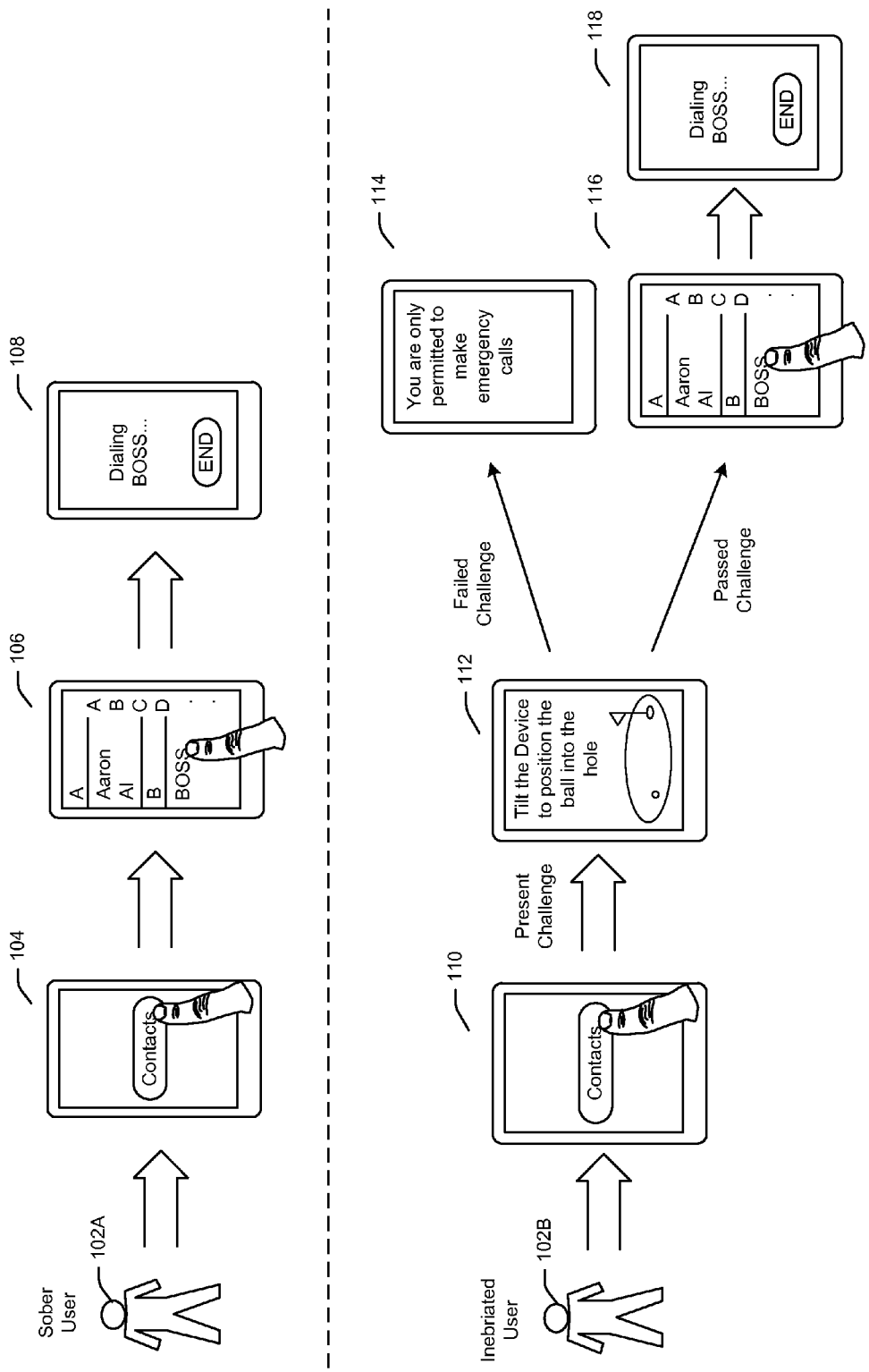
FIG. 1 is a diagram depicting an illustrative use case in accordance with one or more example embodiments of the disclosure.

This disclosure relates to, among other things, devices, methods, computer-readable media, techniques, and methodologies for determining a baseline use profile using sensor data generated from user interactions with a device, presenting challenges to a user if a deviation from the baseline use profile exceeds an acceptable tolerance, and determining whether to restrict device functionality based on user responses to the challenges.

In an example scenario, a user may use a user device such as a smartphone or a tablet device in a variety of behavioral states. For example, the user may operate his smartphone while fully alert or while in a semi-alert state such as while sleepy or inebriated. When in a semi-alert state, the user may not be as adept in operating his smartphone as when he is fully alert. For example, the semi-alert user may apply gestures to a display of the smartphone with reduced accuracy or precision. As another example, the user's semi-alert state may cause the smartphone to exhibit greater vibration or movement than would typically be the case.

In addition, when the user's faculties are impaired, such as when the user is inebriated, he may demonstrate impaired judgment. One of the ways in which the user's impaired judgment may manifest itself is in the use of his smartphone. In particular, when inebriated or otherwise impaired, the user may make questionable decisions regarding whether and with whom to initiate communications using his smartphone. For example, the inebriated user may place a call or send a text message, an instant message, or an e-mail to an individual with whom he would not have chosen (if sober) to communicate with while his faculties were impaired. As another example, the inebriated user may say things or include content in a written message that may prove damaging to his reputation or career.

Example embodiments of the disclosure provide techniques for determining if a user's faculties may be impaired (potentially due to inebriation), and if so determined, presenting the user with challenges, where the user's responses to the challenges dictate whether the user will be permitted to access certain device functionality, such as initiating phone calls or transmitting electronic messages.

In order to determine whether a user's faculties may be impaired, a baseline use profile may be generated from sensor data representative of the user's interactions with the smartphone. Various types of sensor data may be collected. The sensor data may indicate how the user interacts with the smartphone over time. For example, the smartphone may be provided with an inertial sensor such as an accelerometer, a gyroscope, or the like that gathers data representative of movement or vibration of the smartphone along one or more axes. A user's speed and/or acceleration may be calculated from the inertial sensor data. As another example, various biometric sensors may be provided to measure any of a variety of types of biometric data such as, for example, body temperature, pulse rate, electrical activity of the heart (e.g., electrocardiography (ECG) data), and so forth. As yet another example, the smartphone may be provided with a magnetometer that acts as a compass for gathering directional data. As still another example, touch input data may be generated from touch events detected at a touch-sensitive display of the smartphone. The touch events may correspond to any type of gesture such as, for example, a tap, a swipe, or a multi-touch gesture. As still another example, image data may be captured by a camera of the smartphone such as, for example, an infrared camera, a camera with an optical sensor such as a charge coupled device (CCD) or a complementary metal-oxide-semiconductor (CMOS) sensor, an optical image stabilizer, or the like. The image data may reveal changes in the user's position (e.g., the user's head, the user's fingertip, etc.) with respect to the smartphone over time, color changes to the user's skin, and so forth. Various biometric data, such as pulse rate, may be determined from such changes revealed by the image data. The sensor data may include timestamp data or the like that corresponds to a time period during which the associated user interactions occur.

In certain example scenarios, the sensor data may include data generated from an object tracking system. The object tracking system may include one or more cameras (e.g., front facing cameras on a smartphone), one or more inertial sensors, or the like. The object tracking system may periodically generate an (x, y, z) coordinate representing a detected location of an object (e.g., a user's head, hand, fingertip, etc.) in relation to a reference point and an associated timestamp corresponding to a time at which that location was detected. The reference point may be associated with a user device that incorporates the object tracking system such as, for example, a particular portion of a display of the user device. Sensor data of this nature may be generated from user interactions that do that involves physical contact with a device.

While in a configuration mode, the smartphone may calculate various metrics from the sensor data. For example, baseline user dexterity metrics may be generated that reflect a baseline level of dexterity with which the user operates the smartphone. The baseline user dexterity metrics may include an average duration of taps (the average time between initiation and cessation of a tap); an average distance traveled along the display during taps; an average deviation between locations on the display corresponding to initiation of taps and reference locations of the display (e.g., an average distance between one or more pixels corresponding to initiation of a tap and one or more pixels corresponding to a center location of an icon, button, or the like); an average swipe angle; an average swipe distance; an average deviation of swipes from corresponding swipe reference lines; and so forth. The baseline user dexterity metrics may also include an average amount of vibration or movement of the smartphone (e.g., an average acceleration, an average speed, etc.) as gleaned from the inertial sensor data.

In addition to baseline user dexterity metrics, baseline biometric metrics (e.g., average pulse rate, average skin tone, etc.) may be calculated from biometric sensor data as well. While averages have been described as examples, the baseline user dexterity metrics and/or baseline biometric metrics may include any suitable statistical quantities such as medians, modes, or the like. In addition, the baseline user dexterity metrics and/or baseline biometric metrics may include instantaneous metrics (e.g., a duration of a particular tap, a distance travelled along the display for a particular tap, a change in position of an object such as a user's eyes, head, or fingertip, etc.) or metrics over an interval of time (e.g., a distribution of tap durations, a distribution of distances traveled during taps, or the like over some interval of time). While example embodiments of the disclosure may be described herein with reference to user dexterity metrics, it should be appreciated that such embodiments are equally applicable to other types of metrics such as biometric metrics.

A baseline use profile for the smartphone may then be determined from the baseline user dexterity metrics. Image data may also be used to generate the baseline use profile. For example, an average amount of infrared radiation emitted by the user over some period of time may be determined from the image data and included in the baseline use profile. Further, biometric data collected from sensors may be included in the baseline use profile. As such, the baseline use profile may indicate patterns of use of the smartphone over time as reflected by the baseline user dexterity metrics and, optionally, as reflected by other information gleaned from the sensor data (e.g., image data, biometric data, etc.). In certain example scenarios, the baseline use profile may include the baseline user dexterity metrics or other baseline metrics, a statistical distribution of a baseline user dexterity metric or other baseline metric, a standard deviation or variance of a baseline user dexterity metric or other baseline metric, or any other suitable data reflecting a baseline pattern of use of the smartphone.

The baseline use profile may be generated as part of a configuration mode of operation of the smartphone. In particular, the smartphone may execute background processing to analyze the sensor data, generate the baseline user dexterity metrics, and determine the baseline use profile while the user operates the smartphone as part of his daily use. Multiple training sessions may be employed over any suitable period of time (e.g., days, weeks, etc.) to smooth out isolated gross deviations in the sensor data and to increase the accuracy of the baseline user dexterity metrics and the baseline use profile. Generation of the baseline use profile in this manner may rely on an assumption that the user's faculties are not impaired the majority of the time that he uses the smartphone. The baseline use profile may be continually refined over time as additional sensor data is generated. Refinement of the baseline use profile may cease if variance in the baseline user dexterity metrics falls below predetermined threshold(s).

In certain example scenarios, the baseline use profile may be specific to a particular device, and thus, may reflect typical use characteristics of the device by one or more users. A baseline use profile associated with a user device may be generated using metrics derived from a single user's interactions with the device or from user interactions involving multiple users. For example, even if the smartphone is shared among multiple users (e.g., a family of users), the baseline use profile may represent a collective pattern of use of the multiple users. Alternatively, a user may first be authenticated by the user device prior to assessing that user's pattern of use of the device, such that the user's corresponding baseline use profile may be transferrable to another device. For example, a baseline use profile representative of an authenticated user's interactions with the smartphone may be stored as part of the user's profile or account such that when that same user is authenticated on a different device (e.g., a tablet device), the baseline use profile corresponding to the user's profile or account can be retrieved.

While in the configuration mode or another operational mode, the smartphone may continually gather and analyze additional sensor data relating to additional user interactions with the smartphone. This additional sensor data may be compared against the baseline use profile to determine whether enough of a deviation exists to transition the smartphone from the configuration mode to a challenge mode in which user challenges are presented to the user. For example, if the additional sensor data indicates that the additional user interactions with the smartphone are not within a threshold tolerance of the baseline use profile, the smartphone may transition from the configuration mode to the challenge mode. More particularly, in certain example scenarios, the smartphone may compare a baseline user dexterity metric of the baseline use profile to a corresponding metric generated from the additional sensor data to determine whether they deviate by more than a threshold value.

The threshold value may be determined from a distribution in baseline values from which the baseline user dexterity metric is calculated, where the distribution indicates an expected baseline variation in the metric. For example, if the baseline user dexterity metric is a touch metric representative of the precision of touch events (e.g., an average duration of taps, an average deviation in initial points of contact of taps and reference points on a display such as a set of pixels corresponding to the center of an icon, etc.), a distribution of baseline values from which the baseline metric is calculated may be determined, and the expected variation in the baseline metric may correspond to an expected amount of variation in touch precision. For example, a distribution of tap durations may be determined over a period of time during which sensor data is evaluated to generate the baseline use profile. A mean tap duration may then be determined as a baseline user dexterity metric, and the expected variation in tap duration may be determined from the distribution of tap durations from which the mean tap duration is calculated. For example, the expected variation in tap duration may be proportional to the standard deviation of the distribution from the mean tap duration (e.g., one standard deviation). If the baseline user dexterity metric is a motion metric, such as a mean level of acceleration of the user device along one or more axes, then the expected variation in the metric may be determined from a distribution of instantaneous acceleration values over some period of time and may be proportional to the standard deviation of the distribution of acceleration values from the mean level of acceleration.

It should be appreciated that, in certain example scenarios, different expected variations in touch precision and/or movement may be associated with different types of user interfaces. For example, a lesser variation in touch precision may be expected for a touch-sensitive display than an expected variation in user movement for an object tracking interface or an expected variation in audio input received by an audio input interface. Accordingly, a threshold tolerance in deviation from the baseline use profile may account for differing levels of expected dexterity associated with different mechanisms for user interaction with a device.

It should be appreciated that, in certain example scenarios, user dexterity metric values calculated from additional sensor data may not be compared against the corresponding baseline user dexterity metric to determine whether to transition to the challenge mode. Rather, in certain example scenarios, the user dexterity metric values calculated from the additional sensor data may be analyzed to determine a variation in the calculated values, which may then be compared against an expected/permissible variation determined from a distribution of values from which the baseline user dexterity metric is calculated. For example, as part of determining the baseline use profile, an average baseline tap precision (e.g., an average distance between an initial point of contact of a tap on a display and a reference point on the display) may be determined. In addition, a variation in the baseline tap precision values from which the average baseline tap precision is calculated may also be determined. Subsequently, additional tap precision values may be calculated from additional sensor data that is captured, and an average of those values may be calculated. A variation of the additional tap precision values from the average of those values may then be compared to the variation in the baseline tap precision values from the baseline average tap precision to determine whether the variation of the additional tap precision values indicates a greater than expected variation, and thus, potential impairment of the user.

In certain scenarios, a sustained deviation may need to be present before the smartphone transitions to the challenge mode. For example, a deviation that is in excess of a permissible tolerance from a baseline user dexterity metric may need to be sustained for a threshold period of time before the smartphone is transitioned to the challenge mode. In this manner, isolated gross deviations caused, for example, by a user's momentary loss of balance or the like may be prevented from causing a transition to the challenge mode. In certain scenarios, isolated gross deviations having a duration less than a threshold period of time (which may be the same as or different from a threshold period of time that deviations from the baseline use profile that exceed the permissible tolerance are required to persist) may be ignored for the purposes of determining whether to transition to challenge mode or may be smoothed out so as not to exhibit a deviation from the baseline use profile that exceeds a permissible tolerance. Any suitable smoothing function, technique, or algorithm may be employed such as, for example, a moving average, additive smoothing, linear quadratic estimation, various types of analog or digital filters (e.g., Butterworth filter, Chebyshev filter, etc.), Laplacian smoothing, a Savitzky-Golay filter, and so forth. In other example scenarios, if a threshold number of deviations that exceed the permissible tolerance from the baseline use profile occur over a specified period of time, the smartphone may transition to the challenge mode, regardless of the durations of the deviations.

In still other example scenarios, deviations from the baseline use profile may be smoothed based on contextual data. For example, sensor data corresponding to use of the smartphone at a work location during typical work hours, where such use may be gleaned, for example, from location data and/or network connectivity data, may be smoothed on the basis that deviations from the baseline use profile that are present in such data and that are in excess of a permissible tolerance likely do not reflect potential impairment. Alternatively, if the contextual data indicates a low likelihood of potential impairment, the threshold period of time over which such deviations must be sustained in order to cause a transition to challenge mode may be correspondingly increased. Along similar lines, sensor data corresponding to use conditions reflective of an intermediate or high likelihood of potential impairment may not be smoothed or threshold periods of time over which deviations from the baseline use profile that are present in such sensor data and that exceed a permissible tolerance are required to persist may be reduced.

Contextual data indicative of an intermediate or high likelihood of potential impairment which may, in turn, result in a lesser permissible tolerance from the baseline use profile or a lesser threshold period of time over which impermissible deviations from the baseline use profile must persist may relate to, for example, a time of day (e.g., Friday at 5:00 PM) or a location at which the smartphone is being used (e.g., a bar). For example, a first threshold tolerance may be lowered to a second threshold tolerance based on the presence of contextual data such that sensor data that deviates from the baseline use profile by more than the second threshold tolerance but less the first threshold tolerance may nonetheless cause the smartphone to transition from the configuration mode to the challenge mode. In addition, the smartphone may transition to the challenge mode based on identified correlations between contextual data. For example, it may be determined that the smartphone is located in the parking lot of a sports stadium at a time prior to a scheduled sporting event, thereby indicating a greater potential for inebriation or otherwise impaired user faculties.

After transitioning to the challenge mode, the user may be presented with user challenges prior to being permitted to access certain functionality of the smartphone such as voice calling, instant messaging, e-mail messaging, or short message service (SMS) messaging. The challenges may include games, puzzles, questions (e.g., trivia questions), and so forth. The challenges may have a difficulty level that does not exceed the capabilities of a typical user with non-impaired faculties. In certain example scenarios, various challenges may be presented to the user while the smartphone is in the configuration mode in order to gauge the user's ability to respond to the challenges when in a non-impaired state. The baseline use profile may then reflect any deviations between the user's responses to these initial challenges presented in the configuration mode and default response data.

While in the challenge mode, the user's response to a challenge may be evaluated against expected response data. The expected response data may correspond to a response that a typical user is expected to provide. Alternatively, the expected response data may correspond to a response that the particular user of the smartphone is expected to provide based, for example, on responses received from the user to challenges presented while in the configuration mode. If the user's response deviates from the expected response data by more than a threshold tolerance, or in other words, the user fails the challenge(s), the user may be prohibited from accessing restricted functionality such as voice calling, electronic messaging, etc. In addition, in certain example scenarios, various actions may be initiated if the user fails the challenge (s). For example, another user (e.g., a contact from a contact list) who is determined to be located in proximity to the user may be informed of the user's potential impairment. As another example, a voice call or electronic communication to a taxi service may be automatically initiated. As yet another example, an impairment flag or some other form of metadata may be communicated to a peripheral/networked device to cause additional actions to be taken to mitigate effects of the user's potential impairment. For example, the impairment metadata may be communicated to a network interface associated with an automobile via, for example, a suitable wireless communication technology (e.g., Bluetooth™, Wi-Fi™, a cellular communications network, etc.). Upon receipt of the impairment metadata, a controller may disable the ignition switch or otherwise prevent operation of the automobile for a predetermined period of time, or until the user is determined to be no longer impaired. For example, the impairment metadata may reflect a degree of potential impairment, and the amount of time that needs to elapse before the user is determined to be no longer impaired may be determined from a time-decay function that receives the impairment metadata as input. As yet another example, if the user is determined to be potentially impaired, he may be allowed to generate an electronic communication (e.g., an e-mail) or place an online order, but transmission of the communication or processing/transmission of the online order may not be performed. Rather the electronic communication or online order may be queued and presented to the user at a later time when the user is determined not to be impaired to allow the user to modify/cancel the communication or online order. In other scenarios, if the user fails a challenge, and thus is determined to be potentially impaired, a cancellation period for the online order may be extended and/or a notification requesting confirmation of the order may be sent to the user after a period of time has elapsed. Any number of additional actions designed to mitigate the effects of the user's potential impairment may additionally or alternatively be taken.

In certain example scenarios, the threshold tolerance used to evaluate deviations between the response data and expected response data may require that the user's response be completely accurate, while in other scenarios, a certain degree of inaccuracy may be permitted. For example, in certain scenarios, the user may need to provide an accurate solution to a puzzle or an accurate answer to all questions posed in a challenge, while in other scenarios, partial inaccuracy may be permitted (e.g., a partial solution to a puzzle, a certain number of acceptable incorrect answers, etc.). Further, in certain scenarios, if the user fails a challenge, the user may be allowed to attempt the challenge a predetermined number of additional times prior to restricting access to the device functionality.

In certain example scenarios, a challenge may be chosen based on a correspondence between user capabilities that the challenge is intended to measure and the nature of the deviation from the baseline use profile that is observed. For example, if the additional sensor data that is captured indicates a deviation in touch precision from the baseline use profile, the challenge chosen may be designed to measure the user's touch precision. An example of a challenge designed to measure touch precision may be one that requires the user to touch relatively small targets randomly displayed on a touch-sensitive display of the device over a relatively short period of time. As another example, if the additional sensor data that is captured indicates a deviation in movement of the device from the baseline use profile by more than an expected amount of variation in movement, the challenge chosen may be designed to measure the user's steadiness.

Referring now to FIG. 1, which depicts an illustrative use case, an example event flow involving a "sober user" 102A is depicted in the portion of the figure above the dashed line. The user 102A may be assumed to be "sober" if, for example, sensor data captured by the smartphone indicates that the user's interaction with the smartphone is within a threshold tolerance of the baseline use profile. At stage 104, the user may attempt to access a list of contacts on the smartphone. Because the smartphone is not currently in the challenge mode, the sober user 102A may be permitted to access the contacts list at stage 106 and may be permitted to select an intended recipient ("Boss") of a voice call. At stage 108, the call to the user's "Boss" may be initiated.

If an analysis of sensor data in relation to the baseline use profile indicates a deviation that exceeds the threshold tolerance, the smartphone may transition from the configuration mode to the challenge mode. More specifically, deviation from the baseline use profile by more than the threshold tolerance may indicate that the user may have impaired faculties. An example event flow that may occur while in the challenge mode is depicted in the portion of FIG. 1 below the dashed line.

A potentially "inebriated user" 102B may attempt, at stage 110, to access a list of contacts on the smartphone. Because the smartphone is in the challenge mode, a user challenge may be presented to the user 102B at stage 112. The potentially inebriated user 102B may respond to the challenge by applying touches or gestures to a touch-sensitive display of the smartphone, providing an audible response that is captured by a microphone of the smartphone, and so forth. Response data generated from the user's 102B interaction with the smartphone in responding to the challenge may then be compared to expected response data to determine whether the response data is within a threshold tolerance of the expected response data. If so, it may be determined that the user 102B has passed the challenge, and at stage 116, the user 102B may be permitted to access the contact list and select an intended recipient ("Boss") of a voice call. At stage 118, the call to the user's "Boss" may be initiated.

On the other hand, if the response data deviates from the expected response data by more than the threshold tolerance, it may be determined that the user 102B has failed the challenge, and at stage 114, the user 102B may be restricted from accessing various device functionality such as voice calling features, electronic messaging capabilities, and so forth. In some example scenarios, the user 102B may be prohibited from accessing the contact list, launching an electronic messaging application (e.g., an e-mail application), or launching a social networking application at all, while in certain other scenarios, the user 102B may be permitted access to a contact list, call records, stored SMS messages, stored e-mails, a social networking application, or the like, but may be prohibited from initiating and transmitting new communications. Further, in certain example scenarios, the user 102B may be permitted to respond to the challenge a certain number of additional times, and device functionality may only be restricted after a predetermined number of failed attempts to correctly respond to the challenge. In addition, in certain example scenarios, even if the user 102B correctly responds to an initial challenge, one or more additional challenges of varying difficulty may be presented to the user 102B prior to permitting access to desired device functionality.

In certain example scenarios, even if the user 102B fails the challenge(s) and is restricted from accessing certain device functionality, the user 102B may nonetheless be permitted to access other device functionality. For example, at stage 114, the user 102B may be permitted to place voice calls or transmit electronic messages to emergency numbers (e.g., 911), access certain other applications on the smartphone (e.g., games, applications that do not enable communication with contacts or other intended recipients, etc.), or the like. Further, in certain example scenarios, the user 102B may be permitted to accept incoming voice calls or review incoming electronic messages. In addition, in certain example scenarios, various contacts, numbers, social networking profiles, or the like may have been previously tagged or otherwise designated such that the user 102B may be permitted to initiate or transmit communications to the tagged recipients even if the user 102B has failed the challenge(s). Conversely, in certain example scenarios, contacts, numbers, social networking profiles, or the like that the user 102B is prohibited from communicating with if he fails the challenge(s) may be tagged such that the user 102B is nonetheless permitted to initiate communication with non-tagged recipients. It should be appreciated that FIG. 1 merely depicts an example scenario and that any of a variety of other types of actions may be taken to mitigate effects of the potential impairment of the user 102B. For example, impairment metadata may be communicated to peripheral devices to prevent the user 102B from engaging in potentially harmful activities (e.g., operating an automobile). Further, as previously described, electronic communications generated by the user 102B may be queued for subsequent review/modification by the user. Still further, online orders may be queued for subsequent review/modification by the user prior to transmission, a cancellation period of an online order may be lengthened, a notification requesting confirmation of an online order may be sent to the user after a period of time has elapsed, and so forth.

Example embodiments of the disclosure provide a number of advantages or technical effects. For example, in accordance with example embodiments of the disclosure, a baseline use profile may be generated by executing training sessions as part of background processing performed on a user device in a manner that does not impact use of the device by a user. Further, the device may seamlessly transition from a configuration mode to a challenge mode based on a detected deviation from the baseline use profile and/or based on contextual data that may reflect potential diminished faculties of the user. In addition, while in the challenge mode, the potentially impaired user may be presented with challenges to minimize the risk that the user initiates potentially damaging communications using the device. It should be appreciated that the above examples of advantages and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings.

Illustrative Device Architecture

Figure 2:
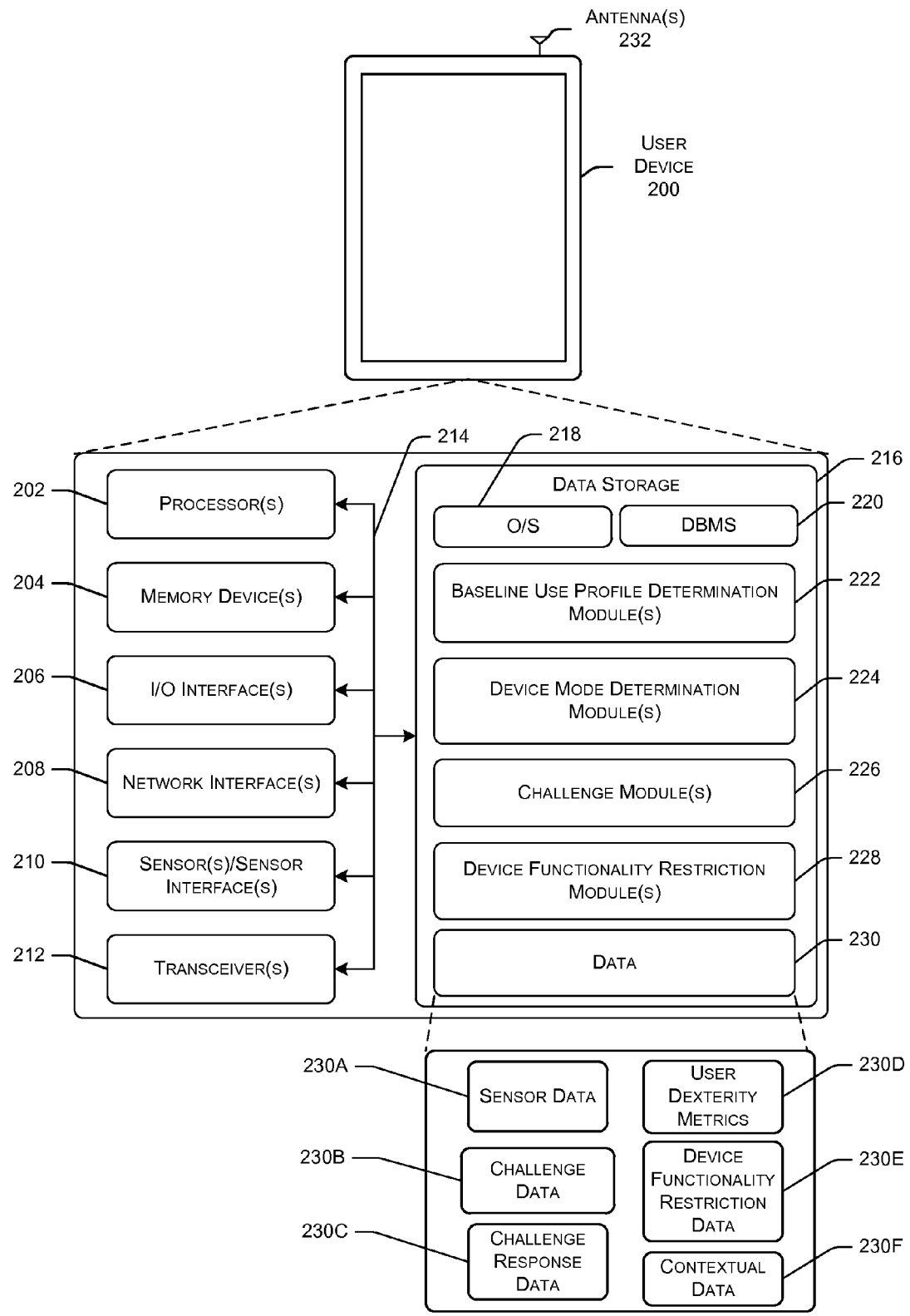
FIG. 2 is a schematic block diagram of an illustrative user device in accordance with one or more example embodiments of the disclosure.

FIG. 2 is a schematic block diagram of an illustrative user device 200 in accordance with one or more example embodiments of the disclosure. The user device 200 may include any suitable computing device including, but not limited to, a mobile device such as a smartphone, a tablet, an e-reader, or the like; a desktop computer; a laptop computer; a wearable computing device such as a smart watch, smart glasses, smart footwear, smart clothing, etc.; in-vehicle devices such as an in-vehicle infotainment (IVI) system; an automobile key fob; a laptop mouse trackpad; an online ordering device; a content streaming device; a kiosk; and so forth.

The device 200 may be configured to communicate via one or more networks (not shown) with one or more servers, user devices, or the like. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the device 200 may include one or more processors (processor(s)) 202, one or more memory devices 204 (generically referred to herein as memory 204), one or more input/output ("I/O") interface(s) 206, one or more network interfaces 208, one or more sensors or sensor interfaces 210, one or more transceivers 212, and data storage 216. The device 200 may further include one or more buses 214 that functionally couple various components of the device 200. The device 200 may further include one or more antennas 232 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 214 may include at least one of a system bus, a memory bus, an address bus, or a message bus, and may permit exchange of information (e.g., data (including computer-executable code), signaling, etc.) between various components of the device 200. The bus(es) 214 may include, without limitation, a memory bus or a memory controller, a peripheral bus, an accelerated graphics port, and so forth. The bus(es) 214 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCM-CIA) architecture, a Universal Serial Bus (USB) architecture, and so forth.

The memory 204 of the device 200 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 204 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 204 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 216 may include removable storage and/or non-removable storage including, but not limited to, magnetic storage, optical disk storage, and/or tape storage. The data storage 216 may provide non-volatile storage of computer-executable instructions and other data. The memory 204 and the data storage 216, removable and/or non-removable, are examples of computer-readable storage media (CRSM) as that term is used herein.

The data storage 216 may store computer-executable code, instructions, or the like that may be loadable into the memory 204 and executable by the processor(s) 202 to cause the processor(s) 202 to perform or initiate various operations. The data storage 216 may additionally store data that may be copied to memory 204 for use by the processor(s) 202 during the execution of the computer-executable instructions. Moreover, output data generated as a result of execution of the computer-executable instructions by the processor(s) 202 may be stored initially in memory 204, and may ultimately be copied to data storage 216 for non-volatile storage.

More specifically, the data storage 216 may store one or more operating systems (O/S) 218; one or more database management systems (DBMS) 220; and one or more program modules, applications, or the like such as, for example, one or more baseline use profile determination modules 222, one or more device mode determination modules 224, one or more challenge modules 226, and one or more device functionality restriction modules 228. The data storage 216 may further store any of a variety of other types of modules such as, for example, one or more application modules associated with one or more applications executable on the device 200. Further, any program modules stored in the data storage 216 may include one or more sub-modules.

In addition, the data storage 216 may store various types of data that may be provided as input to a program module or generated as a result of execution of computer-executable instructions of a program module such as, for example, sensor data 230A, challenge data 230B, challenge response data 230C, user dexterity metrics 230D, device functionality restriction data 230E, and contextual data 230F. Any of the modules depicted in FIG. 2 may include computer-executable code, instructions, or the like that may be loaded into the memory 204 for execution by one or more of the processor(s) 202. Further, any data stored in the data storage 216 may be loaded into the memory 204 for use by the processor(s) 202 in executing computer-executable code. It should be appreciated that "data," as that term is used herein, includes computer-executable instructions, code, or the like.

The sensor data 230A may include data generated by one or more of the sensor(s) 210 as a user interacts with the device 200 over time. The sensor data 230A may include, for example, data captured by an inertial sensor such as an accelerometer, a gyroscope, or the like that indicates movement or vibration of the device 200 along one or more axes. A user's speed and/or acceleration may be calculated from the inertial sensor data. As another example, the sensor data 230A may include any of a variety of types of biometric data such as, for example, body temperature, pulse rate, electrical activity of the heart (e.g., ECG data), and so forth. As another example, the sensor data 230A may include directional data captured by a magnetometer. As yet another example, the sensor data 230A may include touch input data generated from touch events detected at a touch-sensitive display of the device 200. The touch events may correspond to any type of gesture such as, for example, a tap, a swipe, or a multi-touch gesture. As still another example, the sensor data 230A may include image data that may be captured by a camera of the device such as, for example, an infrared camera, a camera with an optical sensor such as a CCD or CMOS sensor, an optical image stabilizer, or the like. The image data may reveal changes in a user's position (e.g., the user's head) with respect to the device 200 over time, color changes to the user's skin, and so forth. Various biometric data, such as pulse rate, may also be determined from such changes revealed by the image data.

The challenge data 230B may include data representative of challenges that may be presented to a user, either in the configuration mode as part of processing to determine a baseline use profile for the device 200 or in the challenge mode. The challenge data 230B may include computer-executable code, instructions, other data, or the like that is representative of challenges that may be presented to the user via, for example, a display of the device 200 and/or computer-executable code, instructions, other data, or the like that facilitates presentation of such challenges. The challenge data 230B may further include a difficulty score or other identifier that indicates the relative difficulty of a challenge. The challenge data 230B may also include data that indicates the number of times a user may be permitted to solve a challenge before access to device functionality is restricted, the amount of time that a user is given for solving a challenge, algorithms for determining the order in which challenges are to be presented to a user, and so forth.

The challenge response data 230C may include data representative of user responses provided to presented challenges. For example, the challenge response data 230C may indicate solutions provided by a user to a challenge (e.g., a puzzle solution, an answer to a trivia question, etc.). The challenge response data 230C may further include expected response data. The expected response data may indicate a default response that a typical user is expected to provide, a default time period in which the typical user is expected to provide the response, and so forth. In certain example embodiments, the challenge response data 230C may include expected response data gleaned from presentation of challenges to a user while the device 200 is in the configuration mode. As previously discussed, various challenges may be presented to a user while the device 200 is in the configuration mode in order to gauge the user's ability to respond to the challenges when in a non-impaired state. Any deviation between the response data received from the user while in the configuration mode and default expected response data may be reflected in the baseline use profile. In this manner, if a user response to a challenge is within a permissible tolerance of a response that he/she is expected to provide, the user may be permitted to access device functionality, even if the user response deviates from default expected response data by more than the permissible tolerance.

The user dexterity metrics 230D may include any suitable metric that is derived from sensor data and that provides a measure of a user's dexterity in operating the device 200. For example, the user dexterity metrics may include an average duration of taps (the average time between initiation and cessation of a tap); an average distance traveled along the display during taps; an average deviation between locations on the display corresponding to initiation of taps and reference locations of the display (e.g., an average distance between one or more pixels corresponding to an initial point of contact and one or more pixels corresponding to a center location of an icon, a button, or the like); an average swipe angle; an average deviation of swipes from corresponding swipe reference lines; and so forth. The user dexterity metrics 230D may also include an average amount of vibration or movement of the smartphone as gleaned from inertial sensor data. While averages have been described as examples, the user dexterity metrics 230D may include any suitable statistical quantities such as medians, modes, or the like.

The device functionality restriction data 230E may include data that indicates device functionality that a user may be restricted from accessing if the user fails challenges presented in the challenge mode. As previously noted, such device functionality may include voice calling, electronic messaging, or the like. The device functionality restriction data 230E may further include data that indicates device functionality that a user may be permitted to access even if the user fails challenges presented in the challenge mode. For example, the device functionality restriction data 230E may indicate that the user is permitted to place voice calls or transmit electronic messages to emergency numbers (e.g., 911); accept incoming calls or review incoming electronic messages; access certain other applications on the device 200 (e.g., games, applications that do not enable communication with contacts or other intended recipients, etc.); or the like, even if the user has failed challenge(s) and has been restricted from accessing other device functionality.

In certain example embodiments, the device functionality restriction data 230E may indicate that a user is entirely prohibited from accessing any voice calling features, launching any electronic messaging application (e.g., an e-mail application), or launching any social networking application.

In other example embodiments, the device functionality restriction data 230E may specify a less restrictive permission level for the user such as one that allows the user to access certain voice calling features (e.g., a contact list, call records, etc.), stored SMS messages, stored e-mails, a social networking application, or the like, but prohibits the user from initiating and transmitting new communications if the user fails the challenge(s). In addition, in certain example embodiments, the device functionality restriction data 230E may tag or otherwise designate various contacts, numbers, social networking profiles, or the like to indicate that the user is permitted to initiate or transmit communications to the tagged recipients even if the user has failed the challenge(s). Conversely, in certain example embodiments, the device functionality restriction data 230E may tag or otherwise designate contacts, numbers, social networking profiles, or the like that the user is prohibited from communicating with if he fails the challenge(s). In such example embodiments, however, the user may be permitted to initiate communication with non-tagged recipients. Further, in certain example embodiments, the device functionality restriction data 230E may specify, based on the presence or absence of a tag or other designation, that a user is permitted or prohibited from accepting an incoming call after it has been determined that the user has failed the presented challenge.

In addition, in certain example embodiments, the device functionality restriction data 230E may indicate that any of a variety of other actions are to be taken if a user fails a challenge such as, for example, transmitting a notification to a recipient determined to be located in proximity to the user informing the recipient of the user's potential impairment; initiating a voice call or an electronic communication to a taxi service; communicating impairment data to a peripheral/networked device to disable operation of the device for a period of time (e.g., disable an automobile); preventing transmission of an electronic communication (e.g., an e-mail) and storing the communication for presentation to the user at a later time when the user is determined not to be impaired to allow the user to modify/cancel the communication; preventing completion of an online purchase and storing the online purchase information (e.g., caching the state of online shopping cart) for presentation to the user at a later time to allow the user to modify/cancel the purchase; allowing completion of an online purchase but extending a cancellation period for the purchase and/or a transmitting a notification to the user requesting confirmation of the purchase after a period of time has elapsed; and so forth.

The device functionality restriction data 230E may additionally include data indicative of acceptable tolerances between challenge response data 230C representative of user responses to challenges and the corresponding challenges. For example, the device functionality restriction data 230E may indicate one or more threshold values representing a permissible deviation between challenge response data and a corresponding challenge that, if exceeded, may result in the user failing the challenge.

The contextual data 230F may include data representative of a time of day during which the device 200 is being used, a location at which the device 200 is being used, or the like. The contextual data 230F may further include data reflecting predetermined time ranges or predetermined locations that may be associated with a greater likelihood of impaired user faculties. In certain example embodiments, these predetermined time ranges or locations may be generally applicable to a group of users. For example, the contextual data 230F may indicate that the device 200 is located at a bar or that the device 200 is being used during a time when people typically socialize (e.g., 5 PM on Friday). In other example embodiments, the predetermined time ranges or predetermined locations may be specific to a particular user of the device 200. For example, usage data may be collected on the device 200 that indicates time periods of use, locations, and so forth of the device 200 over time. Sensor data 230A that is determined to deviate from the baseline use profile by more than an acceptable tolerance over at least a specified duration of time may then be correlated with time periods of use and/or locations of the device 200. In this manner, the contextual data 230F may indicate time periods, locations, and so forth that may be indicative of specific impairment of a particular user.

The data 230 may further include any of a variety of other types of data such as, for example, data indicative of acceptable tolerances between sensor data and a baseline use profile, or more specifically, in certain example embodiments, acceptable tolerances between user dexterity metrics derived from the sensor data and baseline user dexterity metrics forming part of or from which the baseline use profile is generated. In particular, the data 230 may indicate one or more threshold values representing a permissible deviation between a user dexterity metric calculated from incoming sensor data and a baseline user dexterity metric. For example, a tap duration may be calculated from touch input data corresponding to a particular tap and compared to an average tap duration indicated in the baseline use profile. If the permissible deviation is exceeded, a transition from the configuration mode to the challenge mode may occur. In certain example embodiments, the data 230 may further indicate a minimum time over which the deviation from the baseline use profile must be present in order to cause a transition from the configuration mode to the challenge mode.

Referring now to functionality supported by the various program modules depicted in FIG. 2, the baseline use profile determination module(s) 222 may include computer-executable instructions, code, or the like that responsive to execution by one or more of the processor(s) 202 may cause processing to be performed to generate a baseline use profile for the device 200. As previously discussed, the processing may be performed while the device 200 is in the configuration mode, and may include generating baseline user dexterity metrics 230D from sensor data 230A collected over a period of time and determining the baseline use profile based at least in part on the baseline user dexterity metrics 230D. The baseline use profile may indicate the various baseline user dexterity metrics generated from the sensor data 230A as well as distributions of the user dexterity metrics over time. As previously described, a distribution of values of a user dexterity metric may be used to determine an expected/permissible variation from the corresponding baseline user dexterity metric. For example, a distribution of swipe angles may be used to determine an expected/permissible deviation from the average swipe angle. In certain example embodiments, various other types of metrics may be generated from the sensor data 230A and included in the baseline use profile. For example, a metric (e.g., an average amount of infrared radiation emitted by a user) may be calculated from image sensor data and used, at least in part, to generate the baseline use profile. As another example, any of a variety of baseline metrics may be determined from biometric data. Further, in certain example embodiments, a respective standard deviation may be determined for each of one or more baseline user dexterity metrics and included in the baseline use profile.

In certain example embodiments, various touch metric values may be determined from sensor data 230A generated by one or more touch sensors of the sensor(s) 210. For example, a tap duration may be determined by measuring the time elapsed between the initiation of a tap and the cessation of a tap. Initiation of tap may be detected based on a change in capacitance or resistance at one or more positions of an electrical grid of a capacitive or resistive touch-sensitive display. Cessation of a tap may be detected based on a reversion in the change in capacitance or resistance to a default state. Similarly, tap or swipe distance may be determined by calculating the distance between touch input coordinate(s) corresponding to an initial change in capacitance or resistance and touch input coordinate(s) corresponding to a cessation of the change of capacitance or resistance.

The device mode determination module(s) 224 may include computer-executable instructions, code, or the like that responsive to execution by one or more of the processor(s) 202 may cause processing to be performed to determine whether the device 200 should transition from the configuration mode to the challenge mode, or vice versa, and if so determined, to cause the transition. As previously described, one or more sensors 210 of the device may continually generate sensor data as the user interacts with the device 200. Computer-executable instructions of the device mode determination module(s) 224 may be executed to generate user dexterity metrics from the sensor data and compare the user dexterity metrics to baseline user dexterity metrics included in the baseline use profile to determine whether the sets of metrics deviate by more than a permissible tolerance. The permissible tolerance may be determined using a Bayesian technique, a statistical quantity such as a standard deviation, or the like. For example, a particular user dexterity metric derived from the sensor data (e.g., a tap duration of a particular tap) may be compared to a baseline user dexterity metric (e.g., an average tap duration indicated in the baseline use profile) to determine whether it exceeds the baseline user dexterity metric by more than a threshold value. In certain example embodiments, the threshold value may be proportional to a standard deviation of a baseline user dexterity metric or may be proportional to a combined standard deviation of multiple baseline user dexterity metrics.

If a deviation between a user dexterity metric and a baseline user dexterity metric exceeds a permissible tolerance, computer-executable instructions of the device mode determination module(s) 224 may be executed to cause a transition of an operational mode of the device 200 from the configuration mode to the challenge mode. In certain example embodiments, the transition may only occur if the deviation persists for a predetermined amount of time. For example, a block of time may be divided into buckets of equal duration, and a user dexterity metric may be calculated for each time bucket from sensor data received during that period of time. For example, a tap precision metric may be determined for each time interval having a duration of X minutes. Each such tap precision metric may be compared to a corresponding baseline tap precision metric to determine whether a deviation between the two exceeds a permissible tolerance. If the permissible tolerance is exceeded for a threshold number of consecutive time intervals, computer-executable instructions of the device mode determination module(s) 224 may be executed to cause the device 200 to transition from the configuration mode to the challenge mode. Requiring a deviation to persist for a certain period of time before transitioning from the configuration mode to the challenge mode may prevent an unwarranted transition to the challenge mode based on isolated gross deviations that are not likely to be indicative of impaired user faculties.

In addition, the device mode determination module(s) 224 may include computer-executable instructions, code, or the like that responsive to execution by one or more of the processor(s) 202 may cause processing to be performed to transition the device from the challenge mode back to the configuration mode or another operational mode of the device 200. For example, while the device is in the challenge mode, user dexterity metrics may continue to be generated from sensor data and may be compared to baseline user dexterity metrics of the baseline use profile. If any deviation there between is within the permissible tolerance for a predetermined period of time, computer-executable instructions of the device mode determination module(s) 224 may be executed to cause the device 200 to transition from the challenge mode back to the configuration mode or to another operational mode of the device 200. In certain example embodiments, the permissible tolerance may be adjusted (e.g., lowered) and/or the predetermined period of time during which user dexterity metrics are required to be within the permissible tolerance of the baseline use profile may be lengthened while in the challenge mode as compared to the configuration mode. In this manner, a premature transition out of the challenge mode may be avoided even if sensor data indicates a brief period of user lucidity.

In addition, the challenge module(s) 226 may include computer-executable instructions, code, or the like that responsive to execution by one or more of the processor(s) 202 may cause processing to be performed to present challenges to a user while in the challenge mode, receive response data representative of user responses to the challenges, and compare the response data to expected response to generate comparison results. The comparison results may indicate whether the response data is within a permissible tolerance of the expected response data. The challenge module(s) 226 may further include computer-executable instructions for presenting challenges to a user while in the configuration mode in order to determine any baseline deviation between the user's responses to the challenges and default response data.

The device functionality restriction module(s) 228 may include computer-executable instructions, code, or the like that responsive to execution by one or more of the processor(s) 202 may cause processing to be performed to either restrict or permit access to device functionality based on the comparison results received from the challenge module(s) 226. The device functionality restriction module(s) 228 may restrict or permit access to device functionality in accordance with the device functionality restriction data 230E. For example, if the comparison results indicate that the response data deviates from the expected response data by more than the acceptable tolerance, the device functionality restriction module(s) 228 may restrict access to voice calling applications, electronic messaging applications, or the like. Further, as previously described, even if the comparison results indicate that the response data deviates from the expected response data by more than the acceptable tolerance, the user may still be permitted to access certain device functionality including, potentially, certain communication functionality (e.g., emergency dialing or messaging, acceptance of incoming calls, review of incoming electronic messages, etc.). In addition, in certain example embodiments, the device functionality restriction module(s) 228 may permit a user that has failed challenge(s) to nonetheless generate an electronic message (e.g., an e-mail message), and may place the message in a queue without transmitting the message. The message may then be presented to the user at a later point in time if, for example, the device transitions out of the challenge mode or the user passes subsequent user challenges.

Referring now to other illustrative components depicted as being stored in the data storage 216, the O/S 218 may be loaded from the data storage 216 into the memory 204 and may provide an interface between other application software executing on the device 200 and hardware resources of the device 200. More specifically, the O/S 218 may include a set of computer-executable instructions for managing hardware resources of the device 200 and for providing common services to other application programs (e.g., managing memory allocation among various application programs). The O/S 218 may include any operating system now known or which may be developed in the future including, but not limited to, any server operating system, any mainframe operating system, or any other proprietary or non-proprietary operating system.

The DBMS 220 may be loaded into the memory 204 and may support functionality for accessing, retrieving, storing, and/or manipulating data stored in the memory 204 and/or data stored in the data storage 216. The DBMS 220 may use any of a variety of database models (e.g., relational model, object model, etc.) and may support any of a variety of query languages. The DBMS 220 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the device 200 is a mobile device, the DBMS 220 may be any suitable light-weight DBMS optimized for performance on a mobile device.

Referring now to other illustrative components of the device 200, the processor(s) 202 may be configured to access the memory 204 and execute computer-executable instructions loaded therein. For example, the processor(s) 202 may be configured to execute computer-executable instructions of the various program modules of the user device 200 to cause or facilitate various operations to be performed in accordance with one or more embodiments of the disclosure. The processor(s) 202 may include any suitable processing unit capable of accepting data as input, processing the input data in accordance with stored computer-executable instructions, and generating output data. The processor(s) 202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 202 may be capable of supporting any of a variety of instruction sets.

In addition, the device 200 may include one or more input/output (I/O) interfaces 206 that may facilitate the receipt of input information by the device 200 from one or more I/O devices as well as the output of information from the device 200 to the one or more I/O devices. The I/O devices may include, for example, one or more user interface devices that facilitate interaction between a user and the device 200 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The device 200 may further include one or more network interfaces 208 via which the device 200 may communicate with any of a variety of other systems, platforms, networks, devices, and so forth. Such communication may occur via any of the types of networks previously described.

The antenna(s) 232 may include any suitable type of antenna depending, for example, on the communications protocols used to transmit or receive signals via the antenna(s) 232. Non-limiting examples of suitable antennas may include directional antennas, non-directional antennas, dipole antennas, folded dipole antennas, patch antennas, multiple-input multiple-output (MIMO) antennas, or the like. The antenna(s) 232 may be communicatively coupled to one or more transceivers 212 or radio components to which or from which signals may be transmitted or received.

As previously described, the antenna(s) 232 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 232 may additionally, or alternatively, include a Wi-Fi antenna configured to transmit or receive signals in accordance with established standards and protocols, such as the IEEE 802.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna(s) 232 may be configured to transmit or receive radio frequency signals within any suitable frequency range forming part of the unlicensed portion of the radio spectrum.

The antenna(s) 232 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 212 may include any suitable radio component(s) for—in cooperation with the antenna(s) 232—transmitting or receiving radio frequency (RF) signals in the bandwidth and/or channels corresponding to the communications protocols utilized by the device 200 to communicate with other devices. The transceiver(s) 212 may include hardware, software, and/or firmware for modulating, transmitting, or receiving—potentially in cooperation with any of antenna(s) 232—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 212 may further include hardware, firmware, or software for receiving GNSS signals. The transceiver(s) 212 may include any known receiver and baseband suitable for communicating via the communications protocols utilized by the device 200. The transceiver(s) 212 may further include a low noise amplifier (LNA), additional signal amplifiers, an analog-to-digital (A/D) converter, one or more buffers, a digital baseband, or the like.

The sensor(s)/sensor interface(s) 210 may include or may be capable of interfacing with any suitable type of sensing device such as, for example, inertial sensors, force sensors, thermal sensors, image sensors, magnetometers, object tracking sensors, and so forth. Example types of inertial sensors may include accelerometers (e.g., MEMS-based accelerometers), gyroscopes, and so forth.

It should be appreciated that the program modules, applications, computer-executable instructions, code, or the like depicted in FIG. 2 as being stored in the data storage 216 are merely illustrative and not exhaustive and that processing described as being supported by any particular module may alternatively be distributed across multiple modules or performed by a different module. In addition, various program module(s), script(s), plug-in(s), Application Programming Interface(s) (API(s)), or any other suitable computer-executable code hosted locally on the device 200, and/or hosted on other computing device(s) accessible via one or more networks, may be provided to support functionality provided by the program modules, applications, or computer-executable code depicted in FIG. 2 and/or additional or alternate functionality. Further, functionality may be modularized differently such that processing described as being supported collectively by the collection of program modules depicted in FIG. 2 may be performed by a fewer or greater number of modules, or functionality described as being supported by any particular module may be supported, at least in part, by another module. In addition, program modules that support the functionality described herein may form part of one or more applications executable across any number of systems or devices in accordance with any suitable computing model such as, for example, a client-server model, a peer-to-peer model, and so forth. In addition, any of the functionality described as being supported by any of the program modules depicted in FIG. 2 may be implemented, at least partially, in hardware and/or firmware across any number of devices.

It should further be appreciated that the device 200 may include alternate and/or additional hardware, software, or firmware components beyond those described or depicted without departing from the scope of the disclosure. More particularly, it should be appreciated that software, firmware, or hardware components depicted as forming part of the device 200 are merely illustrative and that some components may not be present or additional components may be provided in various embodiments. While various illustrative program modules have been depicted and described as software modules stored in data storage 216, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Moreover, while certain modules may be depicted and described as sub-modules of another module, in certain embodiments, such modules may be provided as independent modules or as sub-modules of other modules.

Illustrative Data Flows and Processes

Figure 3:
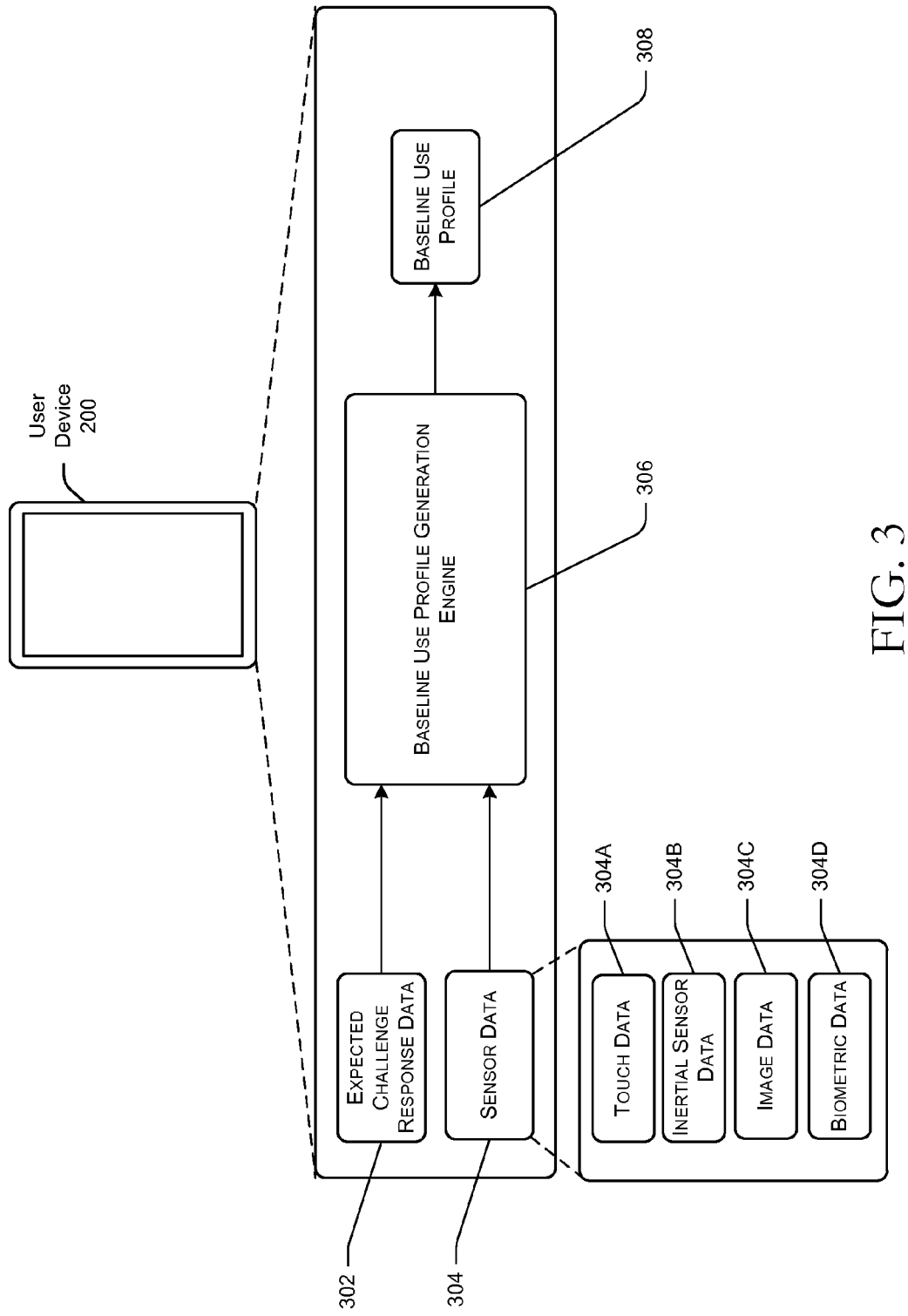
FIG. 3 is a schematic data flow diagram illustrating a device configuration mode in accordance with one or more example embodiments of the disclosure.
Figure 6:
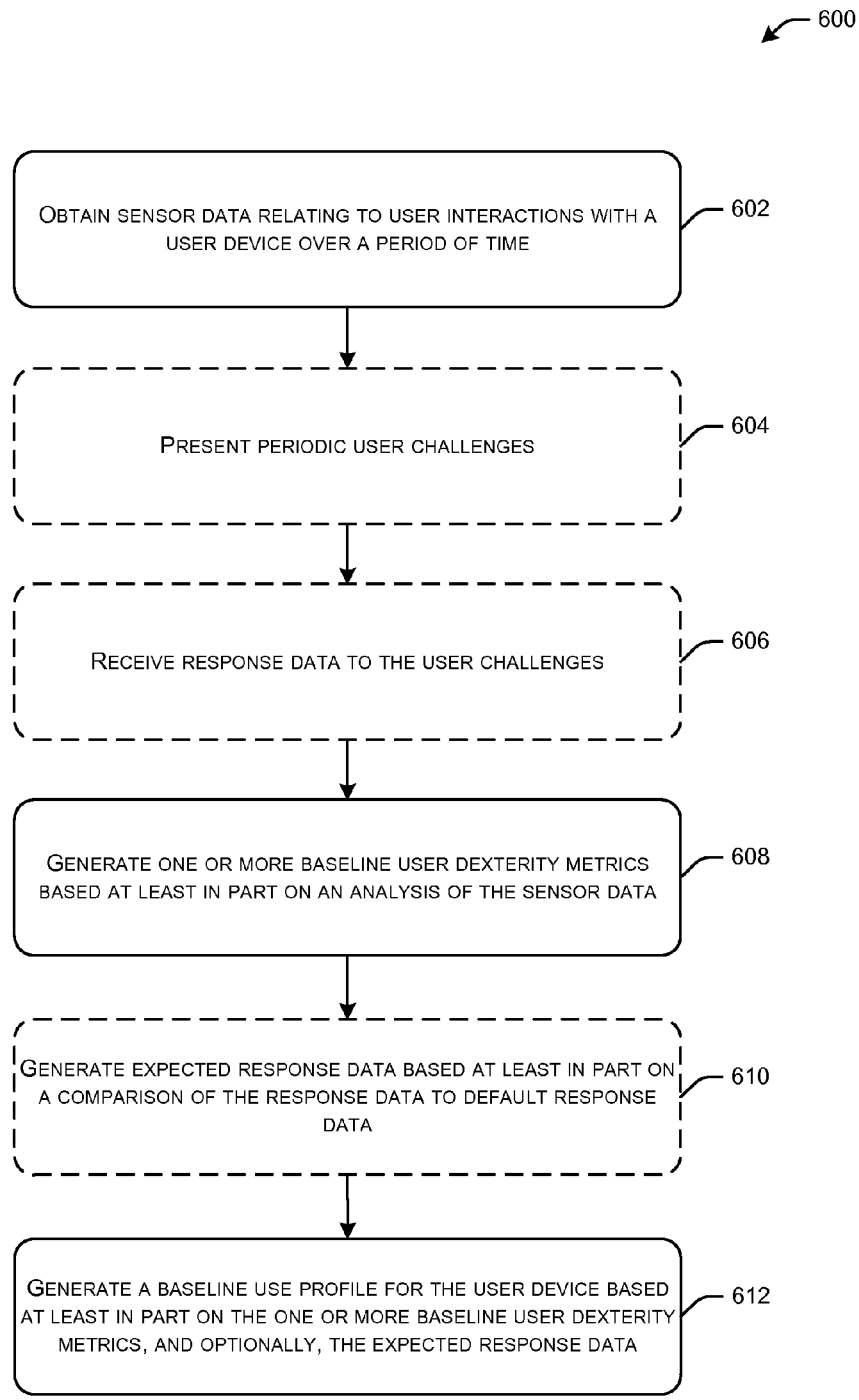
FIG. 6 is a process flow diagram of an illustrative method for generating a baseline use profile in accordance with one or more example embodiments of the disclosure.

FIG. 3 is a schematic data flow diagram illustrating a device configuration mode in accordance with one or more example embodiments of the disclosure. FIG. 6 is a process flow diagram of an illustrative method 600 for generating a baseline use profile for a user device in accordance with one or more example embodiments of the disclosure. FIG. 6 will be described hereinafter in conjunction with FIG. 3.

At block 602 of method 600, the user device 200 may obtain sensor data 304 relating to user interactions with the device 200 over a period of time. The sensor data 304 may include at least a portion of the sensor data 230A generated by one or more sensors 210. As previously described, the sensor data 304 may include, without limitation, touch data 304A generated as a result of touch events detected at a touch-sensitive display of the device 200, inertial sensor data 304B representative of movements or vibration of the device 200, image data 304C, and biometric data 304D.

At block 604, one or more user challenges may be presented periodically to the user via the device 200. As previously noted, user challenges may be presented to the user while the device 200 is in the configuration mode in order to gauge the user's ability to respond to challenges when the user is presumed to be a non-impaired state. At block 606, response data representative of the user's responses to the challenges presented at block 604 may be received.

At block 608, the sensor data 304 may be provided as input to a baseline use profile generation engine 306 to generate one or more baseline user dexterity metrics from the sensor data 304. The baseline user dexterity metrics may include any of the types of metrics previously described. In certain example embodiments, the baseline use profile generation engine may include the baseline use profile generation module(s) 222 or may leverage functionality thereof.

At block 610, computer-executable instructions of the challenge module(s) 226 may be executed to determine expected response data based on a comparison of the response data received at block 606 to default response data. The default response data may indicate an expected accuracy (or permissible inaccuracy tolerance) for a general user. By comparing the actual response data received from the user to the default response data, any deviations there between may be identified, and expected response data 302 may be generated that adjusts the expected accuracy (or permissible inaccuracy tolerance) of the default response data to compensate for the deviations. For example, if the user is less adept at solving a particular challenge than a typical user, the expected response data 302 for that particular user may be associated with a larger permissible inaccuracy tolerance than the default response data allows. In this manner, the expected response data may more closely reflect the abilities of a particular user in a non-impaired state than the default response data.

At block 612, the baseline use profile generation engine 306 may generate a baseline use profile 308 for the device 200 based at least in part on the generated baseline user dexterity metrics, and optionally, further based on the expected response data 302. More specifically, computer-executable instructions of the baseline use profile generation module(s) 222 may be executed to generate the baseline use profile 308. Any of the techniques previously described may be utilized to generate the baseline use profile 308. In addition to the baseline user dexterity metrics, the baseline use profile 308 may further include or reflect additional metrics derived from a distribution of values used to calculate the baseline user dexterity metrics such as, for example, a respective standard deviation of one or more baseline user dexterity metrics, a respective probabilistic distribution of one or more baseline user dexterity metrics, and so forth.

Figure 4:
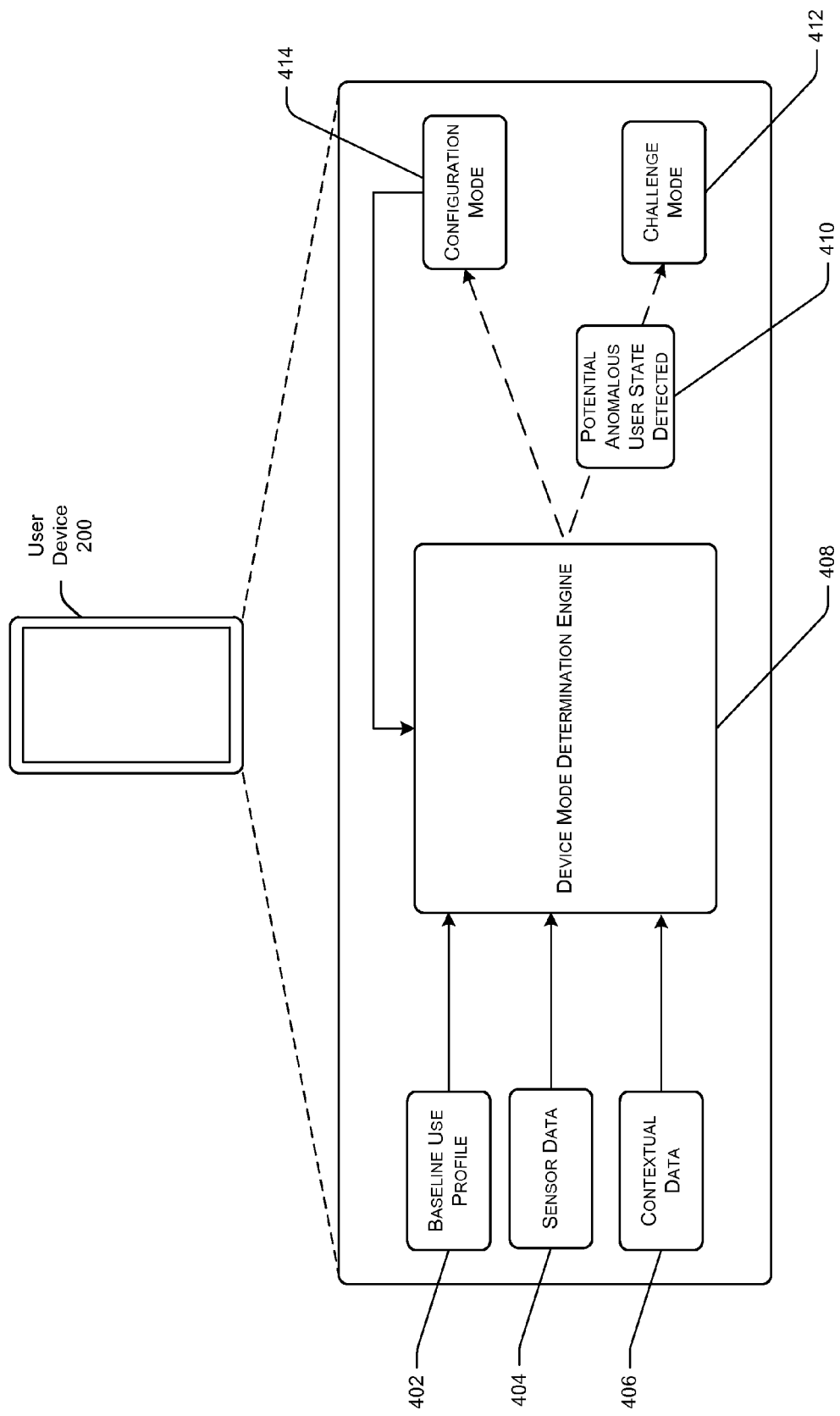
FIG. 4 is a schematic data flow diagram illustrating a determination of an operational device mode in accordance with one or more example embodiments of the disclosure.
Figure 7:
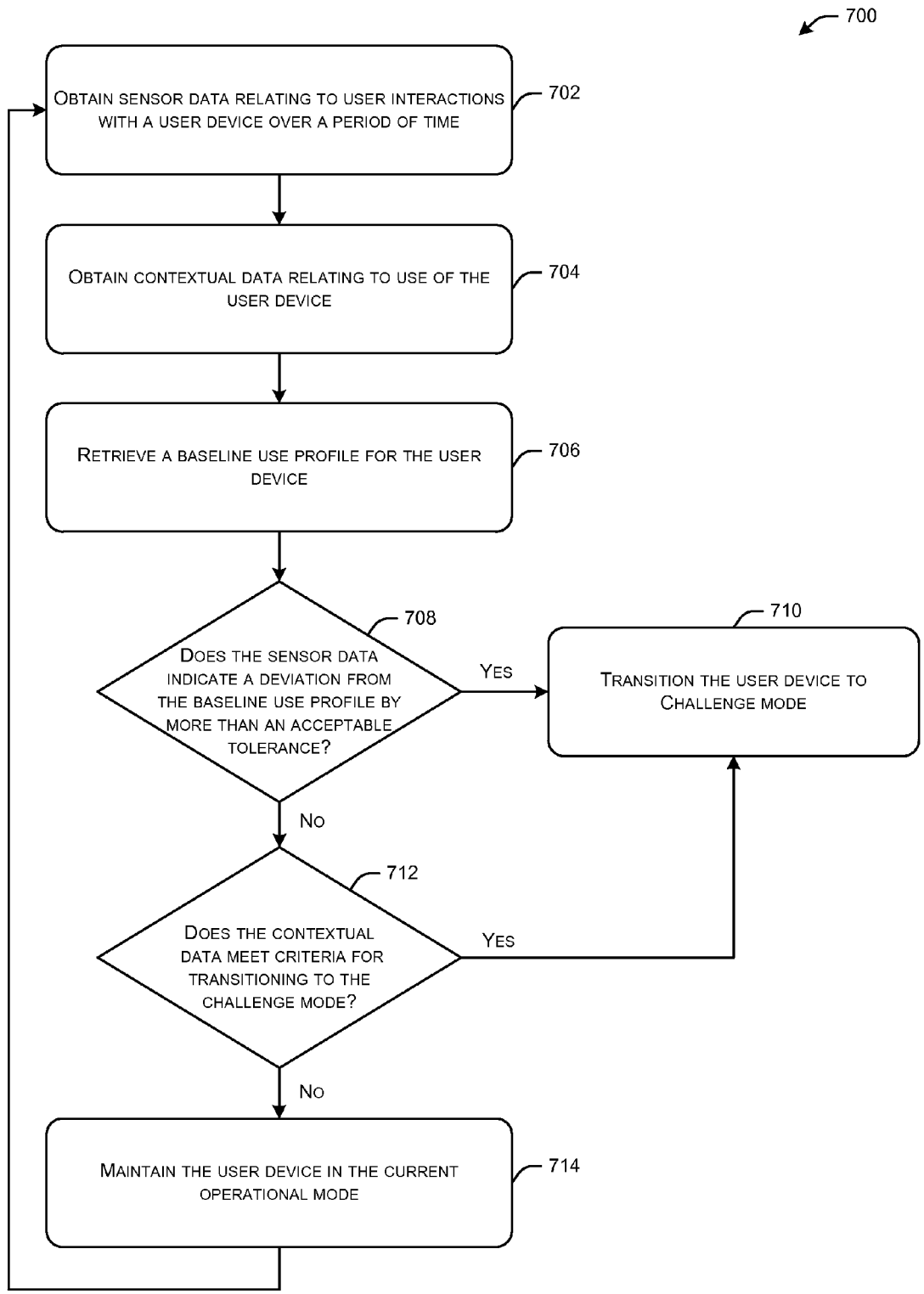
FIG. 7 is a process flow diagram of an illustrative method for determining whether to transition a user device from a configuration mode to a challenge mode in accordance with one or more example embodiments of the disclosure.

FIG. 4 is a schematic data flow diagram illustrating a determination of an operational device mode in accordance with one or more example embodiments of the disclosure. FIG. 7 is a process flow diagram of an illustrative method 700 for determining whether to transition a user device from a configuration mode to a challenge mode in accordance with one or more example embodiments of the disclosure. FIG. 7 will be described hereinafter in conjunction with FIG. 4.

At block 702 of method 700, the user device 200 may obtain sensor data 404 relating to user interactions with the device 200 over a period of time. The sensor data 404 may include a portion of the sensor data 230A that is distinct from those portion(s) of the sensor data 230A used to generate the baseline use profile 402.

At block 704, the device 200 may obtain contextual data 406 relating to use of the device 200. The contextual data 406 may correspond to at least a portion of the contextual data 230F. As previously described, the contextual data 406 may include data relating to a time of day during which the device 200 is being used, a location at which the device 200 is being used, or the like. The contextual data 406 may further include data reflecting predetermined time ranges or predetermined locations that may be associated with a greater likelihood of impaired user faculties. In certain example embodiments, the predetermined time ranges or locations may be generally applicable to a group of users. In other example embodiments, the predetermined time ranges or locations may be indicative of specific impairment of a particular user.

At block 706, the baseline use profile 402 may be retrieved from, for example, data storage 216. At block 708, the baseline use profile 402 and the sensor data 404 may be provided to a device mode determination engine 408 that is configured to determine if the sensor data indicates a deviation from the baseline use profile by more than an acceptable tolerance. In certain example embodiments, the device mode determination engine 408 may include the device mode determination module(s) 224 or may leverage functionality thereof. The device mode determination engine 408 may determine whether the sensor data 404 indicates a deviation from the baseline use profile 402 in accordance with any of the processes described earlier. For example, the device mode determination engine 408 may generate user dexterity metrics from the sensor data 404 and compare the user dexterity metrics to the baseline user dexterity metrics used to generate the baseline use profile 402 to determine whether the sets of metrics deviate by more than an acceptable tolerance (e.g., a standard deviation of the baseline user dexterity metrics multiplied by a proportionality constant, a threshold difference between the metrics, etc.). As previously described, the deviation may be required to persist for a predetermined period of time before the operational mode of the device 200 is changed.

In response to a positive determination at block 708, the device mode determination engine 408 may determine that the user is potentially impaired 410 and may transition the device 200 from a current operational mode (e.g., the configuration mode 414) to the challenge mode 412 at block 710. On the other hand, in response to a negative determination at block 708, the method 700 may continue to block 712. At block 712, the contextual data 406 may be provided as input to the device mode determination engine 408 which may, in turn, determine whether the contextual data satisfies criteria for switching an operational mode of the device from the configuration mode 414 to the challenge mode 412. In particular, even if the sensor data does not indicate an impermissible deviation from the baseline use profile, the device mode determination engine 408 may nonetheless transition the device 200 from a current operational mode (e.g., the configuration mode 414) to the challenge mode 412 if the contextual data 406 indicates an increased likelihood that the user is impaired or may be impaired within the predetermined period of time. In certain example embodiments, after the device 200 has been transitioned to the challenge mode, additional sensor data generated while the device 200 is in the challenge mode may be evaluated against the baseline use profile to determine whether the device 200 should transition out of the challenge mode. The acceptable tolerance in deviation between the additional sensor data and the baseline use profile may be lowered while the device 200 is in the challenge mode in order prevent a premature transition out of the challenge mode. Additionally, or alternatively, a period of time over which the additional sensor data is required to be within the permissible tolerance of the baseline use profile may be increased while the device 200 is in the challenge mode.

In response to a positive determination at block 712, the device mode determination engine 408 may transition the device 200 from a current operational mode (e.g., the configuration mode 414) to the challenge mode at block 710. On the other hand, in response to a negative determination at block 712, the device mode determination engine 408 may, at block 714, maintain the device 200 in the current operational mode (e.g., the configuration mode 414). The method 700 may then proceed iteratively.

It should be appreciated that the determinations at blocks 708 and 712 may occur in any order and/or may be combined as part of a single determination. For example, in certain example embodiments, if the contextual data 406 is determined to satisfy initial criteria for transitioning an operational mode of the device, the determination at block 708 may nonetheless be performed to determine whether to actually transition the device 200 to the challenge mode 412. However, if the contextual data 406 satisfies the initial criteria, the acceptable tolerance may be narrowed such that less of a deviation from the baseline use profile is required to initiate a transition to the challenge mode 412. It should be appreciated that while example embodiments of the disclosure have been described as involving a transition from the configuration mode to the challenge mode, the device may switch to the challenge mode from a mode of operation that is different from the configuration mode. For example, after the baseline use profile is generated, the device may transition from the configuration mode to an intermediate operational mode in which additional sensor data that is received is evaluated against the baseline use profile. The device may then transition to the challenge mode from the intermediate operational mode when a deviation from the baseline use profile that exceeds an acceptable tolerance occurs. In addition, contextual data may be evaluated as described earlier.

In addition, in certain example scenarios, other aspects of a user's interaction with the device 200 may be analyzed to determine whether to transition the device 200 to the challenge mode. For example, an electronic communication generated by the user may be analyzed prior to transmission in order to determine whether particular words or phrases are present in the electronic communication that have previously been identified as having a potentially negative connotation or effect. If such words or phrases are detected, the device 200 may be transitioned to the challenge mode, and the electronic communication may only be transmitted if the user passes one or more challenges presented while in the challenge mode. In certain example embodiments, even if the user passes the challenge(s), the communication may nonetheless not be transmitted, and may be cached for later presentation to the user to enable the user to modify the communication if desired. In other example embodiments, if the user passes the challenge(s), the communication may be transmitted only if it is directed to a recipient flagged as an approved recipient or not flagged as a restricted recipient.

Figure 5:
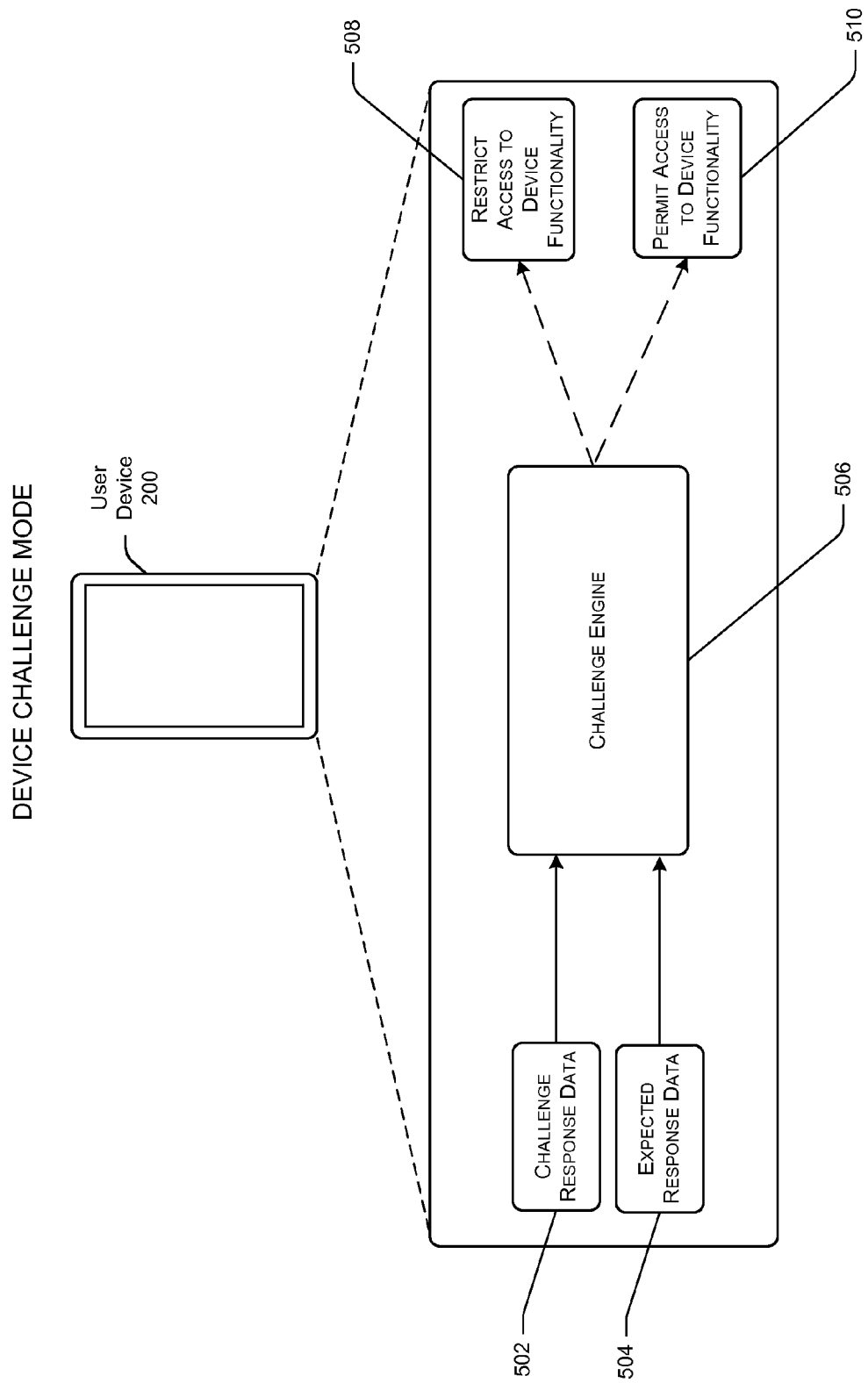
FIG. 5 is a schematic data flow diagram illustrating a device challenge mode in accordance with one or more example embodiments of the disclosure.
Figure 8:
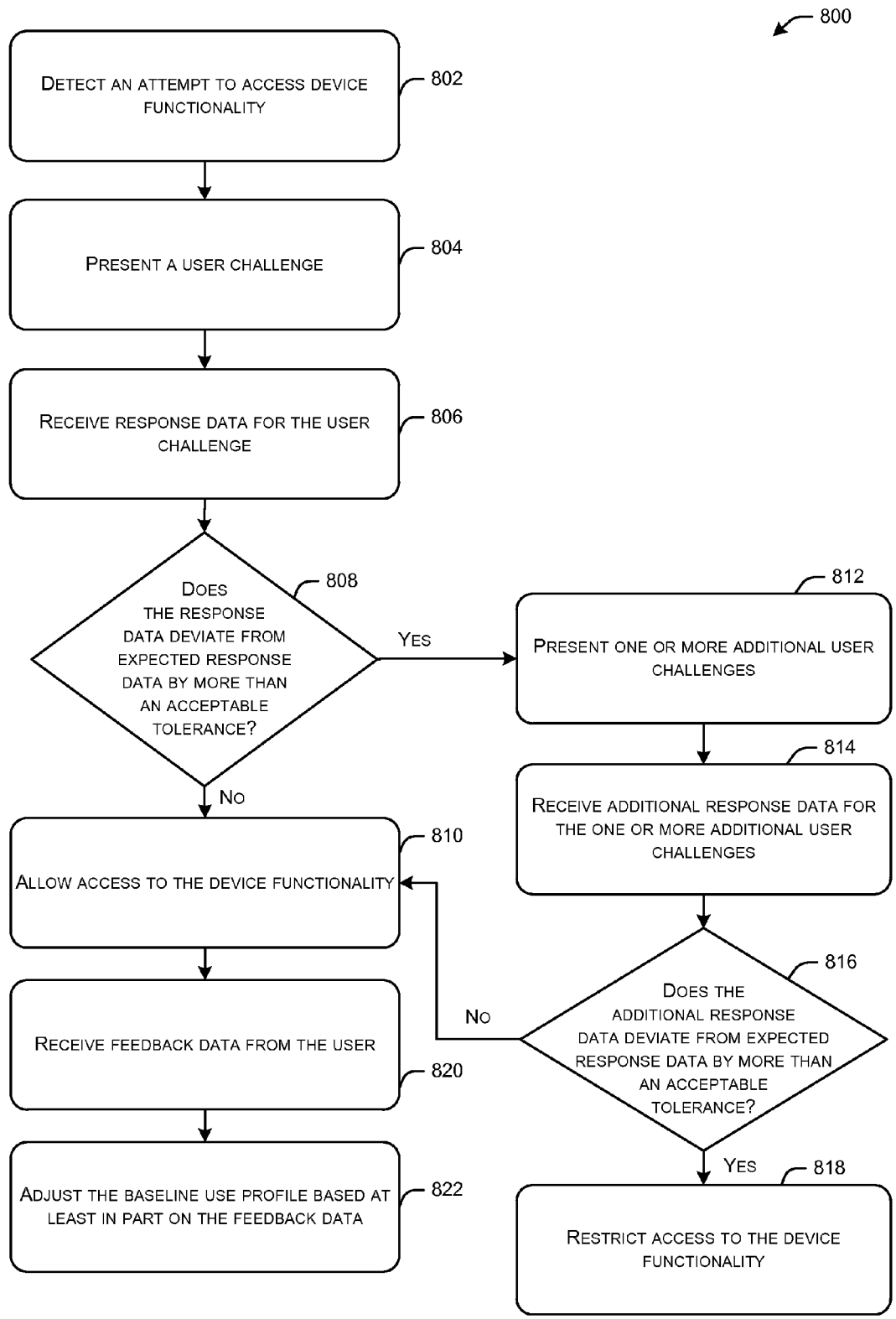
FIG. 8 is a process flow diagram of an illustrative method for presenting user challenges to determine whether to restrict device functionality in accordance with one or more example embodiments of the disclosure.

FIG. 5 is a schematic data flow diagram illustrating a device challenge mode in accordance with one or more example embodiments of the disclosure. FIG. 8 is a process flow diagram of an illustrative method 800 for presenting user challenges to determine whether to restrict device functionality in accordance with one or more example embodiments of the disclosure. FIG. 8 will be described hereinafter in conjunction with FIG. 5.

At block 802 of method 800, the user device 200 may detect an attempt to access device functionality. For example, an attempt to launch a voice calling application, an electronic messaging application, a social networking application, or the like may be detected. In other example embodiments, an attempt to initiate a call or generate or transmit an electronic message to a particular recipient may be detected.

At block 804, the challenge engine 506 may present a user challenge to the user. The challenge engine 506 may include the challenge module(s) 226 or leverage functionality thereof. In particular, computer-executable instructions of the challenge module(s) 226 may be executed to cause a user challenge to be presented to the user. The challenge may be a puzzle, game, set of one or more questions, or the like that the user must provide one or more responses to prior to potentially being provided with access to the requested device functionality. At block 806, the challenge engine 506 may receive response data 502 generated from inputs received from the user in response to the challenge.

At block 808, the response data 502 and expected response data 504 for the challenge may be provided as inputs to the challenge engine 506 which may determine, based at least in part on the response data 502 and the expected response data 504, whether the response data 502 deviates from expected response data 504 for the challenge by more than an acceptable tolerance. The challenge engine 506 may generate one or more comparison results indicative of this determination and may provide the comparison result(s) to the device functionality restriction module(s) 228.

In response to a negative determination at block 808, the device functionality restriction module(s) 228 may permit the user to access the requested device functionality in accordance with the device functionality restriction data 230E. For example, the user may be permitted to place a voice call, generate/transmit an electronic message, or the like to a desired recipient. In certain example embodiments, in response to a positive determination at block 808, the device functionality restriction module(s) 228 may prevent the user from accessing the requested device functionality. In other example embodiments, in response to a positive determination at block 808, the challenge engine 506 may present one or more additional challenges to the user at block 812.

At block 814, the challenge engine 506 may receive additional response data generated from input received from the user in response to the additional challenge(s). At block 816, the challenge engine 506 may determine whether the additional response data deviates from the expected response data by more than an acceptable tolerance. The acceptable tolerance utilized at block 816 may be a more or less permissive tolerance than the tolerance utilized at block 808. The challenge engine 506 may generate one or more comparison results indicative of the determination at block 816 and may provide the comparison result(s) to the device functionality restriction module(s) 228.

In response to a negative determination at block 816, the device functionality restriction module(s) 228 may permit the user to access the requested device functionality at block 810 in accordance with the device functionality restriction data 230E. On the other hand, in response to a negative determination at block 816, the device functionality restriction module(s) 228 may prevent the user from accessing the requested device functionality at block 818. In certain example embodiments, user authentication processing may be performed prior to allowing access to the device functionality at block 810. For example, image data captured by a camera of the device 200 may be compared to stored image data to authenticate the user who responded to the challenge(s). In addition, sensor data (e.g., touch data, motion data, biometric data, etc.) may be captured and analyzed to authenticate the user. For example, user dexterity metrics (e.g., touch metrics, motion metrics, etc.) and/or biometric metrics (e.g., pulse rate) may be calculated from the sensor data and compared to corresponding metrics of the baseline use profile to determine whether a sufficient correspondence exists there between to authenticate the user. In this manner, the potentially impaired user may be precluded from circumventing the challenges by having another user respond to the challenges.

From block 810, the method 800 may proceed to block 820, where feedback data may be received from the user. The feedback data may indicate that the user is not in an impaired state, and thus, that the device 200 prematurely entered the challenge mode and unnecessarily presented challenges to the user. At block 822, the feedback data may be used to modify the baseline use profile. For example, an acceptable/permissible tolerance for variation in dexterity (e.g., variation in touch precision, variation in movement of the device 200, etc.) may be increased based on the feedback data so that if sensor data that is similar to that which caused the device 200 to enter the challenge mode is received in the future, a transition to the challenge mode may be avoided. More specifically, increasing the permissible/acceptable tolerance in deviation from the baseline use profile may allow for greater variation between the baseline use profile and user dexterity metrics calculated from additional sensor data that is received.

One or more operations of the methods 600, 700, or 800 may have been described above as being performed by a device 200, or more specifically, by one or more engines or one or more program modules executing on such a device. It should be appreciated, however, that any of the operations of methods 600, 700, or 800 may be performed, at least in part, in a distributed manner by one or more other devices, or more specifically, by one or more program modules, applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods 600, 700, or 800 may be described in the context of the illustrative device 200, it should be appreciated that such operations may be implemented in connection with numerous other device configurations.

The operations described and depicted in the illustrative methods of FIGS. 6-8 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 6-8 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Program modules, applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program modules, or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A method, comprising:
   generating, by a touch sensor of a user device, first touch input data from touch events occurring as part of a first set of user interactions with the user device;
   generating, by a motion sensor of the user device, first motion data from user movements or movements of the user device occurring as part of the first set of user interactions with the user device;
   generating, by one or more processors of the user device, baseline user dexterity metrics from the first touch data and the first motion data, wherein the baseline user dexterity metrics comprise a baseline touch metric representative of a precision of touch events of the first set of user interactions with the user device and a baseline motion metric representative of an amount of movement caused by the first set of user interactions with the user device;
   determining, by the one or more processors, a baseline pattern of use from the baseline user dexterity metrics, wherein the baseline pattern of use indicates an expected variation in touch precision and an expected variation in movement;
   generating, by the touch sensor, second touch data from touch events occurring as part of a second set of user interactions with the user device;
   generating, by the motion sensor, second motion data from user movements or movements of the user device occurring as part of the second set of user interactions with the user device;
   generating, by the one or more processors, a touch metric from the second touch data and a motion metric from the second motion data;
   determining, by the one or more processors, that the touch metric deviates from the baseline touch metric by more than the expected variation in touch precision or that the motion metric deviates from the baseline motion metric by more than the expected variation in movement;
   switching, by the one or more processors, an operational mode of the user device from a configuration mode of operation to a challenge mode of operation;

presenting a first user challenge via the user device;
receiving first response data for the first user challenge;
determining, by the one or more processors, that the first response data deviates from expected response data for the first user challenge by more than a threshold tolerance;
preventing, by the one or more processors, initiation of a voice call or transmission of an electronic message;
exiting the challenge mode responsive to receipt of second response data for the first user challenge that is within the threshold tolerance of the expected response data or responsive to expiration of a timer;
presenting, in the configuration mode of operation, a second user challenge via the user device;
receiving second response data to the second user challenge; and
determining the expected response data from a deviation between the second response data to the second user challenge and default expected response data for the second user challenge.

2. The method of claim 1, wherein the touch metric is a first touch metric and the motion metric is a first motion metric, the method further comprising:
storing the electronic communication; and
generating, by the touch sensor, third touch data from touch events occurring as part of a third set of user interactions with the user device;
generating, by the motion sensor, third motion data from movements occurring as part of the third set of user interactions with the user device;
generating, by the one or more processors, a second touch metric from the third touch data and a second motion metric from the third motion data;
determining, by the one or more processors, that the second touch metric is within the expected variation in touch precision from the baseline touch metric or that the second motion metric is within the expected variation in movement from the baseline motion metric;
presenting a notification via the user device that the electronic communication has been stored; and
providing a capability to transmit the electronic communication.

3. The method of claim 1, wherein the threshold tolerance is a first threshold tolerance, the method further comprising:
presenting an additional user challenge via the user device;
receiving additional response data for the additional user challenge;
determining, by the one or more processors, that the additional response data is within a second threshold tolerance of expected response data for the additional user challenge;
authenticating, by the one or more processors, a user based on image data generated by an image sensor of the user device or biometric data generated by a biometric sensor of the user device; and
permitting initiation of the voice call or transmission of the electronic message.

4. A method, comprising:
generating, by one or more sensors of a user device, first sensor data relating to a first set of user interactions with the user device, wherein the first sensor data comprises at least one of touch input data or movement data;
determining, by one or more processors of the user device, from the first sensor data, one or more baseline metrics indicating a baseline level of dexterity of the first set of user interactions;
generating, by the one or more processors, a baseline use profile based at least in part the one or more baseline metrics;
generating, by the one or more sensors, second sensor data relating to a second set of user interactions with the user device;
generating, by the one or more processors, one or more metrics indicating a level of dexterity of the second set of user interactions;
determining, by the one or more processors, that the one or more metrics deviate from the baseline use profile by more than a threshold tolerance representative of an expected variation in dexterity;
transitioning, by the one or more processors, an operational mode of the user device to a challenge mode of operation;
detecting, in the challenge mode, an attempt to access first functionality of the user device;
presenting a first user challenge to a user of the user device;
receiving response data for the first user challenge;
determining, by the one or more processors, that the response data deviates from expected response data for the first user challenge by more than a second threshold tolerance;
preventing, by the one or more processors, access to the first functionality; and
permitting, by the one or more processors, access to second functionality.

5. The method of claim 4, wherein the threshold tolerance is a first threshold tolerance, the method further comprising:
detecting, in the challenge mode, an attempt to access functionality of the user device;
presenting a first user challenge to a user of the user device;
receiving response data for the first user challenge;
determining, by the one or more processors, that the response data deviates from expected response data for the first user challenge by more than a second threshold tolerance; and
restricting, by the one or more processors, access to the functionality of the user device.

6. The method of claim 5, further comprising prior to restricting access to the functionality of the user device:
presenting one or more additional user challenges to the user;
receiving additional response data for the one or more additional user challenges; and
determining, by the one or more processors, that the additional response data deviates from expected response data for the one or more additional user challenges by more than the threshold tolerance or by more than one or more additional threshold tolerances.

7. The method of claim 5, further comprising:
presenting, in a configuration mode, one or more initial user challenges to the user;
receiving, in the configuration mode, response data to the one or more initial user challenges; and
determining, by the one or more processors, the expected response data based at least in part on an extent of deviation between the response data to the one or more initial user challenges and default response data.

8. The method of claim 5, further comprising:
detecting receipt of an incoming voice call after determining that the response data deviates from expected response data for the first user challenge by more than the second threshold tolerance; and
permitting acceptance of the incoming voice call.

9. The method of claim 5, wherein restricting the functionality of the user device comprises preventing transmission of an electronic message, and wherein the one or more metrics indicating a level of dexterity of the second set of user interactions is a first set of one or more metrics, the method further comprising:
- storing, by the one or more processors, the electronic message;
- generating, by the one or more sensors, third sensor data relating to a third set of user interactions with the user device;
- generating, by the one or more processors, a second set of one or more metrics indicating a level of dexterity of the third set of user interactions;
- determining, by the one or more processors, that the second set of one or more metrics is within the threshold tolerance of the baseline use profile; and
- presenting the electronic message to the user to enable modification of the electronic message prior to transmission.

10. The method of claim 4, wherein the one or more metrics indicating a level of dexterity of the second set of user interactions is a first set of one or more metrics, the method further comprising:
- generating, by the one or more sensors, third sensor data relating to a third set of user interactions with the user device;
- generating, by the one or more processors, a second set of one or more metrics indicating a level of dexterity of the third set of user interactions;
- determining, by the one or more processors, that the second set of one or more metrics deviates from the baseline use profile by more than the threshold tolerance;
- identifying contextual data indicating one or more use characteristics for the user device;
- determining, by the one or more processors, that the contextual data satisfies criteria for transitioning to the challenge mode; and
- transitioning, by the one or more processors, the operational mode of the user device to the challenge mode.

11. The method of claim 10, wherein the contextual data comprises at least one of a time during the third set of user interactions or a location of the user device during the third set of user interactions, and wherein determining that the contextual data satisfies criteria for transitioning to the challenge mode comprises determining that the time falls within a predetermined range of times indicating a first increased likelihood of diminished user faculties or that the location corresponds to a predetermined location indicating a second increased likelihood of diminished user faculties.

12. The method of claim 4, wherein the threshold tolerance is a first threshold tolerance, the method further comprising:
- detecting, in the challenge mode, an attempt to access functionality of the user device;
- presenting a first user challenge to a user of the user device;
- receiving response data for the first user challenge;
- determining, by the one or more processors, that the response data is within a second threshold tolerance of expected response data for the first user challenge; and
- permitting, by the one or more processors, access to the functionality of the user device.

13. The method of claim 4, wherein the second functionality comprises at least one of initiation of a voice call to a designated emergency number, transmission of an electronic message to the designated emergency number, or access to an application that does not enable initiation of voice calls or transmission of electronic messages.

14. A device, comprising:
at least one processor; and
at least one memory storing computer-executable instructions that, responsive to execution by the at least one processor, cause the at least one processor to:
- determine from first sensor data relating to a first set of user interactions with the device to determine one or more baseline metrics indicating a baseline level of dexterity of the first set of user interactions;
- generate a baseline use profile based at least in part the one or more baseline metrics;
- generate, from second sensor data relating to a second set of user interactions with the device, one or more metrics indicating a level of dexterity of the second set of user interactions;
- determine that the one or more metrics deviate from the baseline use profile by more than a first threshold tolerance representative of an expected variation in dexterity;
- cause a transition of the device to a challenge mode of operation;
- detect, in the challenge mode, an attempt to access functionality of the device;
- present a first user challenge to a user of the user device;
- receive response data for the first user challenge;
- determine that the response data is within a second threshold tolerance of expected response data for the first user challenge; and
- allow access to the functionality of the device.

15. The device of claim 14, wherein the at least one processor is further configured to execute the computer-executable instructions to:
- receive feedback data from the user; and
- modify the baseline use profile based at least in part on the feedback data by increasing the first threshold tolerance.

16. The device of claim 14, wherein the at least one processor is further configured to execute the computer-executable instructions to:
- generate, from third sensor data relating to a third set of user interactions with the device, one or more metrics indicating a level of dexterity of the third set of user interactions;
- determine that the one or more metrics indicating a level of dexterity of the third set of user interactions are within the threshold tolerance of the baseline use profile;
- cause a transition of the device from the challenge mode to a different operational mode;
- identify contextual data indicating one or more use characteristics for the device;
- determine that the contextual data satisfies criteria for adjusting the threshold tolerance;
- adjust the threshold tolerance to generate an adjusted threshold tolerance;
- determine that the one or more metrics indicating a level of dexterity of the third set of user interactions deviates from the baseline use profile by more than the adjusted threshold tolerance; and
- cause another transition of the device to the challenge mode.

17. The device of claim 14, wherein the threshold tolerance is a first threshold tolerance, and wherein the at least one processor is further configured to execute the computer-executable instructions to:
- detect, in the challenge mode, an attempt to access first functionality of the device;
- present a first user challenge to a user of the device;
- receive response data for the first user challenge;

determine that the response data deviates from expected response data for the first user challenge by more than a second threshold tolerance;
prevent access to the first functionality; and
permit access to second functionality of the device.

* * * * *